C. M. SKINNER AND LE ROY J. FOWLER.
GREASE CUP.
APPLICATION FILED MAR. 10, 1919.
1,309,428. Patented July 8, 1919.
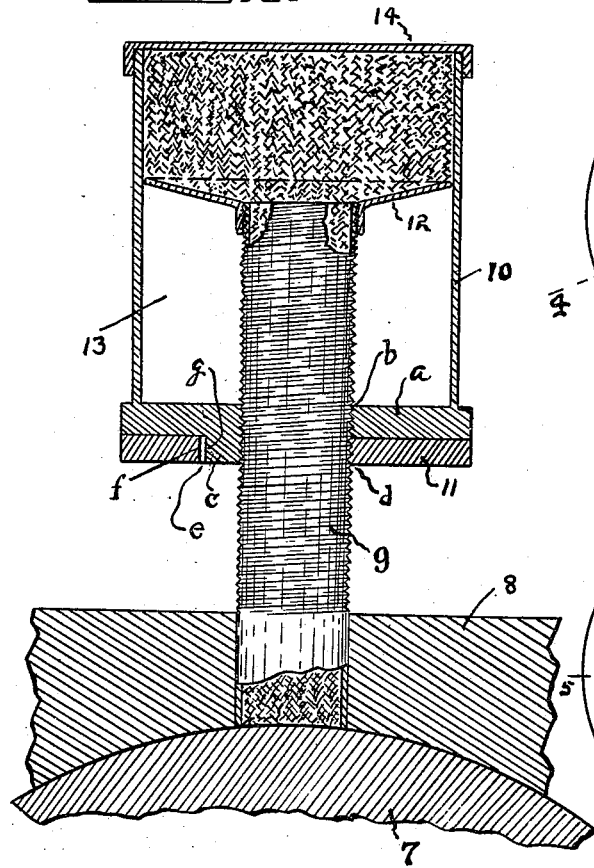
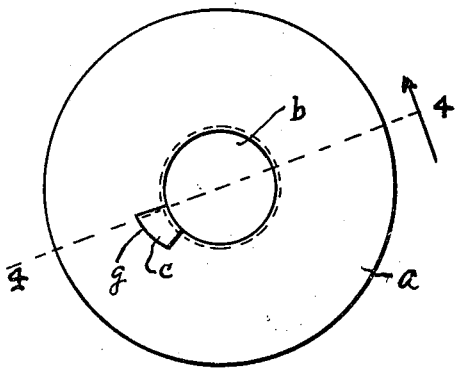
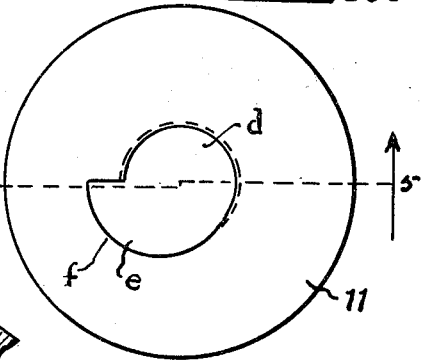
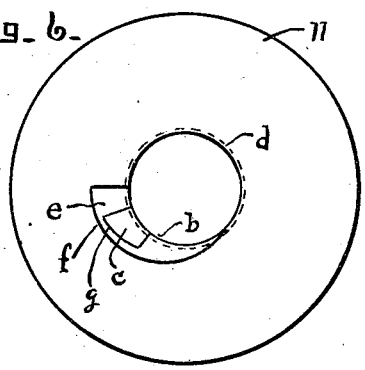
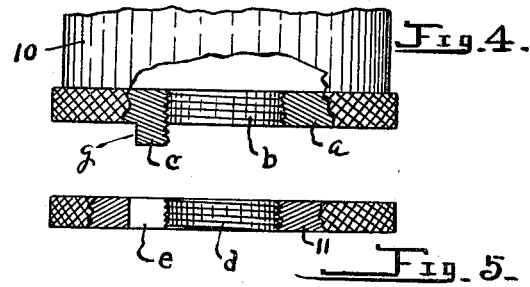
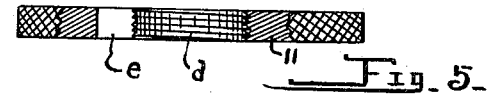
Inventors
Claude M. Skinner
and
Le Roy J. Fowler.
By Hiram A. Sturges,
Attorney

UNITED STATES PATENT OFFICE.

CLAUDE M. SKINNER AND LE ROY J. FOWLER, OF OMAHA, NEBRASKA.

GREASE-CUP.

1,309,428.　　　Specification of Letters Patent.　　Patented July 8, 1919.

Application filed March 10, 1919.　Serial No. 281,639.

*To all whom it may concern:*

Be it known that we, CLAUDE M. SKINNER and LE ROY J. FOWLER, citizens of the United States, residing at Omaha, in the county of Douglas and State of Nebraska, have invented certain new and useful Improvements in Grease-Cups, of which the following is a specification.

This invention relates to an improved grease cup, and has for one of its objects to prevent detachment of the cup from the bearings or other support to which it is attached, said detachment often being accidental or caused by vibrations of the bearings.

Another object is to provide a grease cup which will be convenient in use and may be adjusted to cause a pressure of the grease in a direction of the bearings, and to consist of few and simple parts so that it may be economically manufactured.

In the accompanying drawing Figure 1 is a view of the grease cup in longitudinal section showing it applied to the conducting tube of a bearing. Fig. 2 is a bottom plan view of the grease cup. Fig. 3 is a bottom plan view of a locking-disk. Fig. 4 is a broken away view showing the lower part of the grease cup. Fig. 5 is a broken away side view of the locking disk. Fig. 6 is a bottom plan view of the grease cup and locking disk when assembled, to show relative position of parts.

Referring now to the drawing, numeral 7 indicates a shaft mounted for rotation in its bearings 8, said bearings being provided with an exteriorly threaded tube 9 for conducting grease to the shaft.

We provide a cylindrical grease cup 10 having a bottom $a$ provided at its middle with a threaded aperture $b$ and also provided with a lug $c$ which projects outwardly from said bottom near or closely adjacent to the aperture $b$. In the drawing, the lug $c$ is shown to be provided with threads, but while this construction is preferred, it is not important, and the threads for the lug $c$ may be dispensed with if desired.

Numeral 11 indicates a locking-disk provided at its middle with an interiorly threaded aperture $d$ and also provided with a recess $e$ opening on its aperture, said recess having a wall $f$ non-concentric with the threaded wall of the aperture $d$.

Since that part of the tube 9 outwardly of the bearing 8 is exteriorly threaded, the grease cup and disk may be mounted thereon and may be rotated for moving the cup longitudinally of said tube, the lug $c$ being disposed loosely in the recess $e$ of the locking disk.

It will be seen that the radial distance from the center of the aperture $b$ in the bottom of the cup to that part of the contact-wall $g$ of its lug, farthest remote from said center is less than the radial distance from the center of the aperture $d$ of the disk to that part of the wall $f$ of its recess $e$ farthest remote from its center, and it will be understood that when the lug $c$ is disposed in that part of greatest area of the recess $e$, the cup and disk may be simultaneously rotated to move the grease cup longitudinally of the tube 9, but if the disk is rotated to cause the wall $f$ of its recess $e$ to engage the lug $c$ of the grease cup, a revoluble movement of the grease cup will be prevented since the threaded wall of its bottom $a$ will be pressed against the tube 9, and therefore the grease cup may be secured in stationary relation with said tube, and may be adjusted longitudinally of said tube.

Numeral 12 indicates an annular flange which is removably mounted upon the end of the tube 9, its area being approximately equal to the area in plan of the chamber 13 of the grease cup. An adjustment may be made of the grease cup so that the flange 12 will be disposed in the lower part of the chamber 13, and the lid 14 being removed, the cup may then be filled, and after the lid has been replaced, adjustments may be made of the grease cup longitudinally of the tube 9 to cause a pressure of the grease, the consistency of the latter being such that this feature is of advantage for moving the grease through the tube 9 to the shaft.

We claim:—

1. In a grease cup, a conducting-tube, a receptacle communicating with the tube, said receptacle having a bottom provided with an outwardly projecting lug and having a threaded aperture in engagement with said tube, a disk having a threaded aperture also in engagement with the tube and having a non-concentric recess for receiving said lug, said disk being revoluble for engagement of the wall of its recess with said lug for pressing the bottom of the receptacle against the tube to maintain said receptacle in stationary relation with the tube at longitudinal intervals thereof.

2. In a grease cup, a conducting pipe having an annular flange, a receptacle circumscribing the annular flange and communicating with said pipe, said receptacle having its bottom provided with an outwardly projecting lug and having a threaded aperture in engagement with said pipe, a disk having a threaded aperture also in engagement with the pipe and having a non-concentric recess for receiving said lug, said disk being movable for engagement of the wall of its recess with said lug to cause a pressure of the bottom of the receptacle against said pipe.

In testimony whereof, we have affixed our signatures in presence of two witnesses.

CLAUDE M. SKINNER.
LE ROY J. FOWLER.

Witnesses:
HIRAM A. STURGES,
ARTHUR H. STURGES.

Copies of this patent may be obtained for five cents each, by addressing the "Commissioner of Patents, Washington, D. C."